(12) United States Patent
Saito (10) Patent No.: US 7,443,600 B2
(45) Date of Patent: Oct. 28, 2008

(54) ZOOM LENS AND IMAGE PICKUP APPARATUS HAVING THE SAME

(75) Inventor: Shinichiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/734,803

(22) Filed: Apr. 13, 2007

(65) Prior Publication Data

US 2007/0242366 A1 Oct. 18, 2007

(30) Foreign Application Priority Data

Apr. 14, 2006 (JP) ............................. 2006-111902

(51) Int. Cl.
*G02B 15/14* (2006.01)
(52) U.S. Cl. ...................... 359/682; 359/686
(58) Field of Classification Search ................. 359/680, 359/681, 682, 686
See application file for complete search history.

(56) References Cited

U.S. PATENT DOCUMENTS 5,386,320 A 1/1995 Takada 6,721,106 B2 4/2004 Yamamoto
7,336,426 B2 * 2/2008 Nakatani et al. ............ 359/683
2002/0131184 A1 * 9/2002 Yasui ........................ 359/680

FOREIGN PATENT DOCUMENTS

| JP | 05-134181 A | 5/1993 |
| JP | 6-230281 A | 8/1994 |
| JP | 2001-343588 A | 12/2001 |

* cited by examiner

*Primary Examiner*—Scott J Sugarman
(74) *Attorney, Agent, or Firm*—Canon U.S.A. Inc. IP Division

(57) ABSTRACT

At least one exemplary embodiment is directed to a zoom lens which includes, in order from the object side to the image side, a first lens unit having a negative refractive power, a second lens unit having a negative refractive power, a stop, a third lens unit having a positive refractive power, and a fourth lens unit having a positive refractive power. The distance between the first lens unit and the second lens unit changes during zooming. At least one of the second, third, and fourth lens units moves so that the distance between the second lens unit and the third lens unit at the telephoto end is smaller than that at the wide-angle end and so that the distance between the third lens unit and the fourth lens unit at the telephoto end is larger than that at the wide-angle end. The distance between the stop and the third lens unit changes during zooming.

14 Claims, 11 Drawing Sheets

FIG. 3

FIG. 4A (WIDE-ANGLE)

FIG. 4B (MIDDLE)

FIG. 4C (TELEPHOTO)

FIG. 8A (WIDE-ANGLE)

FIG. 8B (MIDDLE)

FIG. 8C (TELEPHOTO)

FIG. 9

FIG. 10A (WIDE-ANGLE)

FIG. 10B (MIDDLE)

FIG. 10C (TELEPHOTO)

FIG. 11

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same.

2. Description of the Related Art

Recently, image pickup apparatuses (e.g., cameras) that use a solid-state image pickup device, for example, camcorders, digital still cameras, and monitoring cameras, have been required to be high-performance and small in the overall size. Accordingly, optical systems (e.g., photographing optical systems) used for these cameras, such as a zoom lens, are required to be small and have a wide field angle and high optical performance.

An example of a conventional small and wide-field-angle zoom lens is a negative lead type zoom lens that includes a plurality of lens units and in which the most object-side lens unit has a negative refractive power.

U.S. Pat. No. 5,386,320 discusses a three-unit negative lead type zoom lens that includes first to third lens units having negative, negative, and positive refractive powers in order from the object side to the image side and in which the first lens unit does not move during zooming and the first lens unit has a focusing function.

Japanese Patent Laid-Open No. 6-230281 discusses a three-unit negative lead type zoom lens in which the first lens unit consists of two lenses including a meniscus positive lens convex toward the object side.

U.S. Pat. No. 6,721,106 discusses a four-unit negative lead type zoom lens that includes first to fourth lens units having negative, negative, positive, and positive refractive powers in order from the object side to the image side and in which the first to third lens units move to zoom.

The above-described four-unit negative lead type zoom lens can be easily reduced in size and increased in field angle compared to the three-unit negative lead type zoom lenses.

However, since the entire lens system is asymmetrical, distortion tends to occur on the wide-angle side.

In addition, on the wide-angle side, it is difficult to secure a sufficient peripheral light quantity.

SUMMARY OF THE INVENTION

At least one exemplary embodiment of the present invention is directed to a zoom lens that can be configured to be used in an image pickup apparatus (e.g., still cameras, camcorders, digital still cameras, and monitoring cameras, and other image pickup apparatus as known by one of ordinary skill in the relevant arts).

At least one exemplary embodiment of the present invention is directed to a zoom lens in which aberrations are well corrected and that has a wide field angle and high optical performance, and an image pickup apparatus having the same.

In an aspect of at least one exemplary embodiment of the present invention, a zoom lens includes, in order from the object side to the image side, a first lens unit having a negative refractive power, a second lens unit having a negative refractive power, a stop, a third lens unit having a positive refractive power, and a fourth lens unit having a positive refractive power. The distance between the first lens unit and the second lens unit changes during zooming. At least one of the second, third, and fourth lens units moves so that the distance between the second lens unit and the third lens unit at the telephoto end is smaller than that at the wide-angle end and so that the distance between the third lens unit and the fourth lens unit at the telephoto end is larger than that at the wide-angle end. The distance between the stop and the third lens unit changes during zooming.

In another aspect of at least one exemplary embodiment of the present invention, an image pickup apparatus includes a zoom lens, and an image pickup device receiving an image formed by the zoom lens. The zoom lens includes, in order from the object side to the image side, a first lens unit having a negative refractive power, a second lens unit having a negative refractive power, a stop, a third lens unit having a positive refractive power, and a fourth lens unit having a positive refractive power. The distance between the first lens unit and the second lens unit changes during zooming. At least one of the second, third, and fourth lens units moves so that the distance between the second lens unit and the third lens unit at the telephoto end is smaller than that at the wide-angle end and so that the distance between the third lens unit and the fourth lens unit at the telephoto end is larger than that at the wide-angle end. The distance between the stop and the third lens unit changes during zooming.

Further features of the present invention will become apparent from the following description of exemplary embodiments (with reference to the attached drawings).

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Exemplary embodiments of a zoom lens and an image pickup apparatus using the same according to the present invention will be described.

Figure 1:
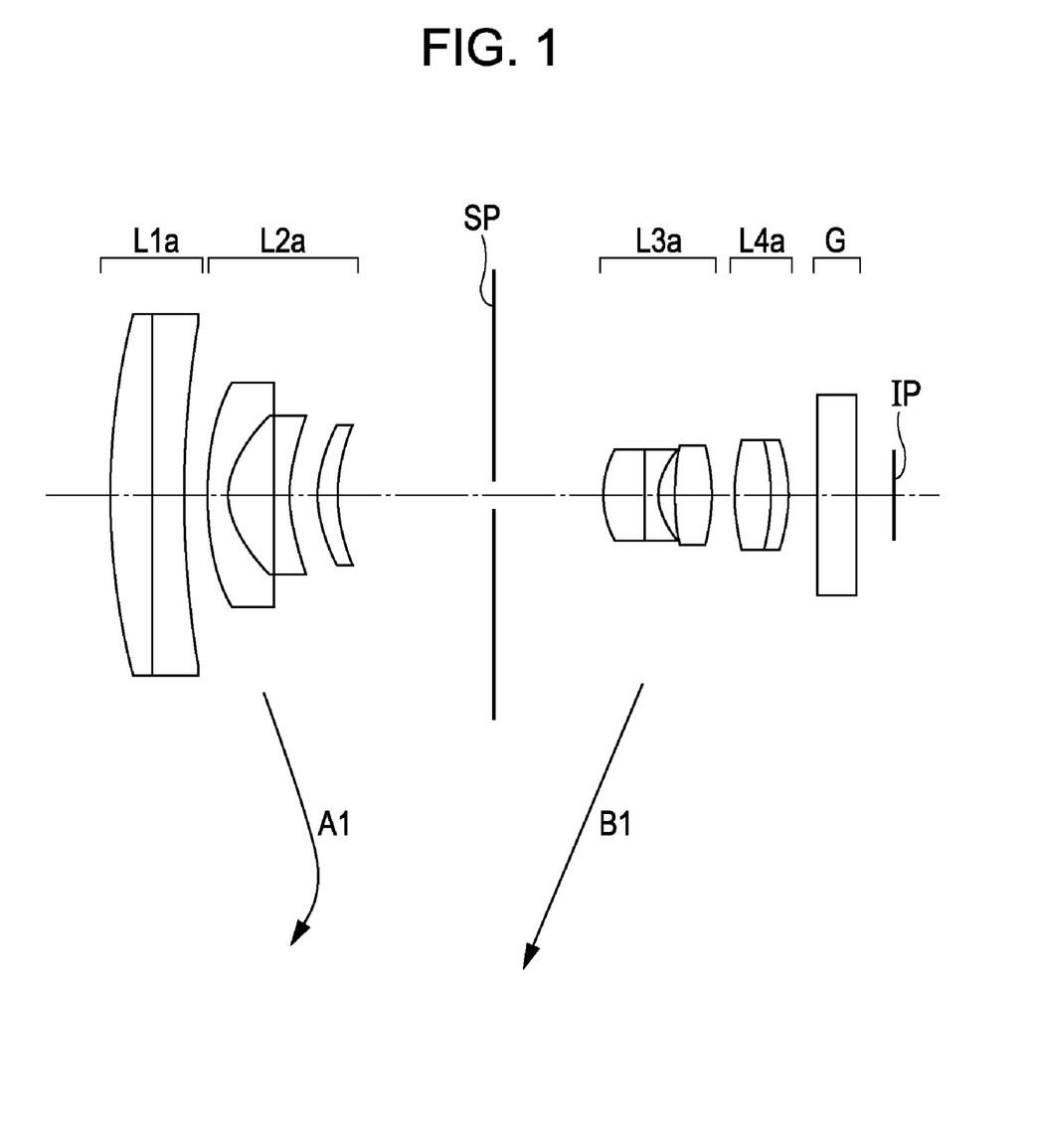
FIG. 1 illustrates a lens sectional view of exemplary embodiment 1.
Figure 2A:
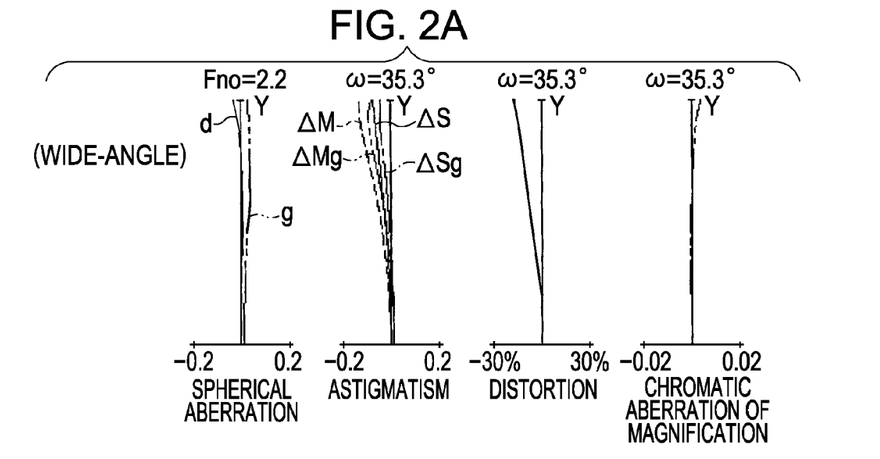
FIGS. 2A, 2B, and 2C illustrate aberrations of exemplary embodiment 1.
Figure 2B:
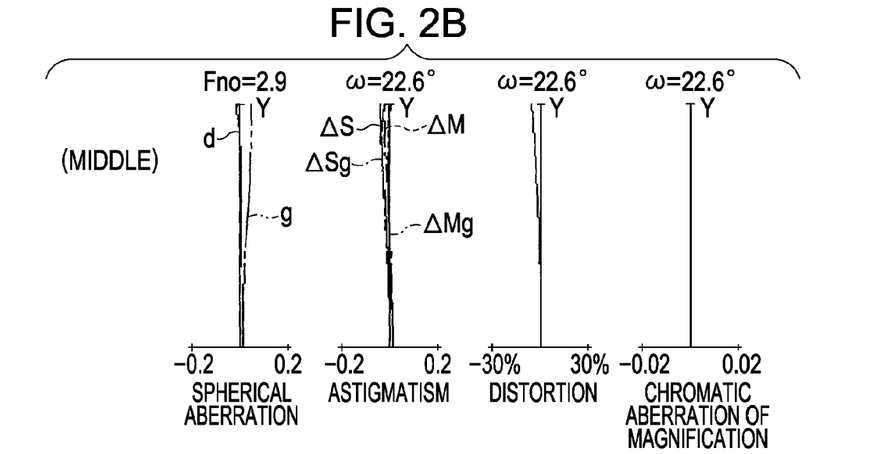
Figure 2C:
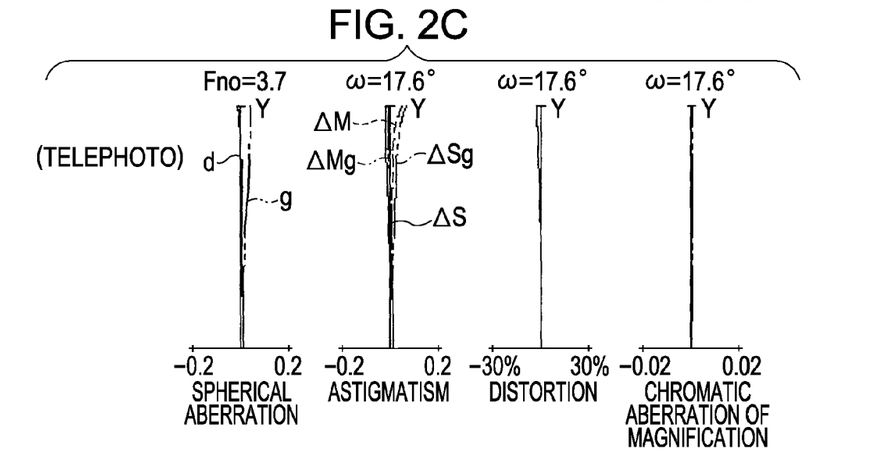

FIG. 1 illustrates a lens sectional view of a zoom lens of exemplary embodiment 1 at the wide-angle end (short focal length end). FIGS. 2A, 2B, and 2C illustrate aberration diagrams of the zoom lens of exemplary embodiment 1 at the wide-angle end, the middle zooming position, and the telephoto end (long focal length end), respectively.

Figure 3:
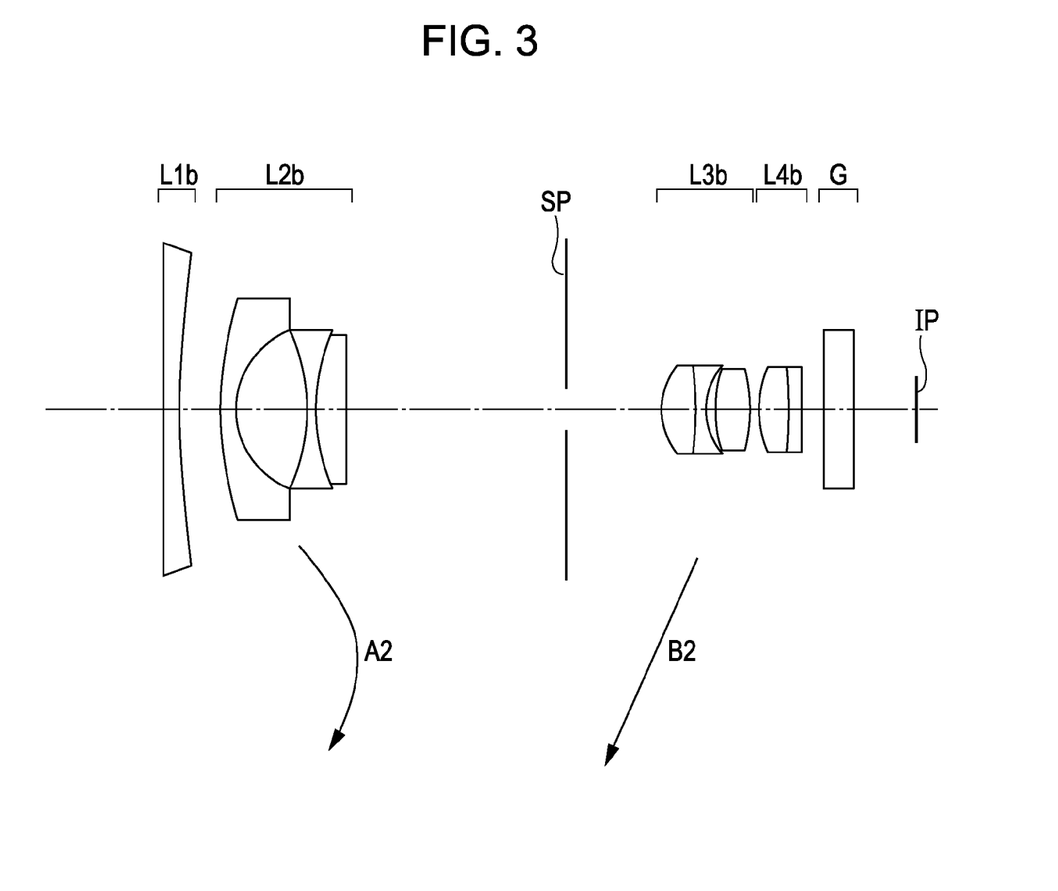
FIG. 3 illustrates a lens sectional view of exemplary embodiment 2.
Figure 4A:
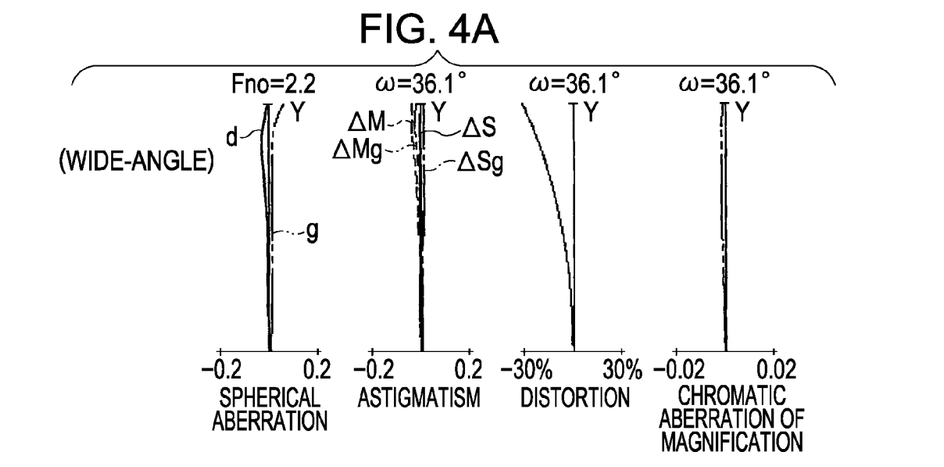
FIGS. 4A, 4B, and 4C illustrate aberrations of exemplary embodiment 2.
Figure 4B:
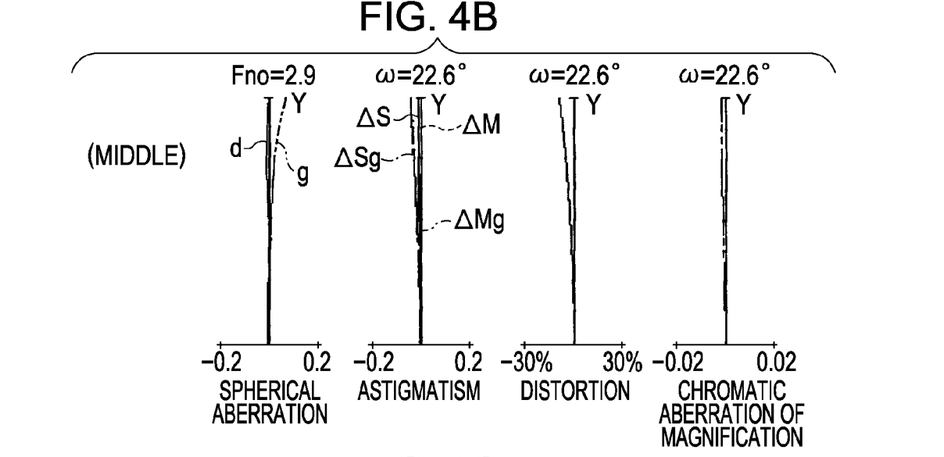
Figure 4C:
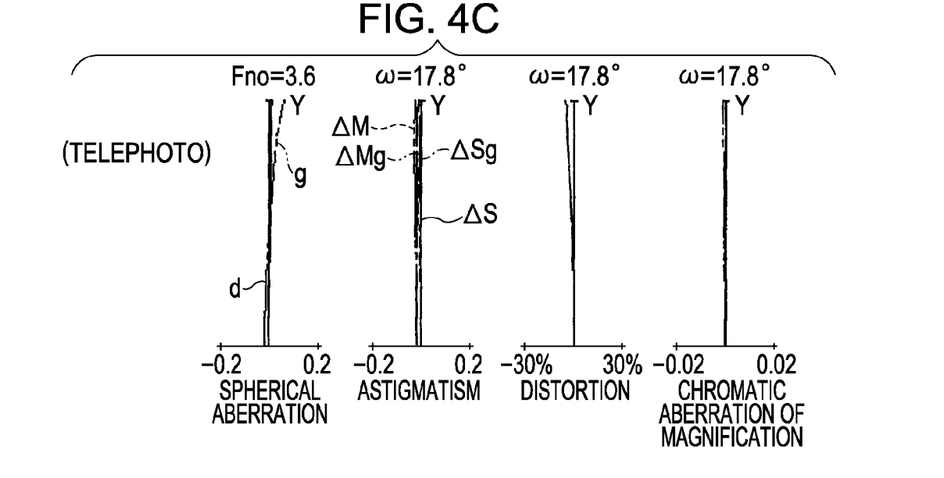

FIG. 3 illustrates a lens sectional view of a zoom lens of exemplary embodiment 2 at the wide-angle end. FIGS. 4A, 4B, and 4C illustrate aberration diagrams of the zoom lens of exemplary embodiment 2 at the wide-angle end, the middle zooming position, and the telephoto end, respectively.

Figure 5:
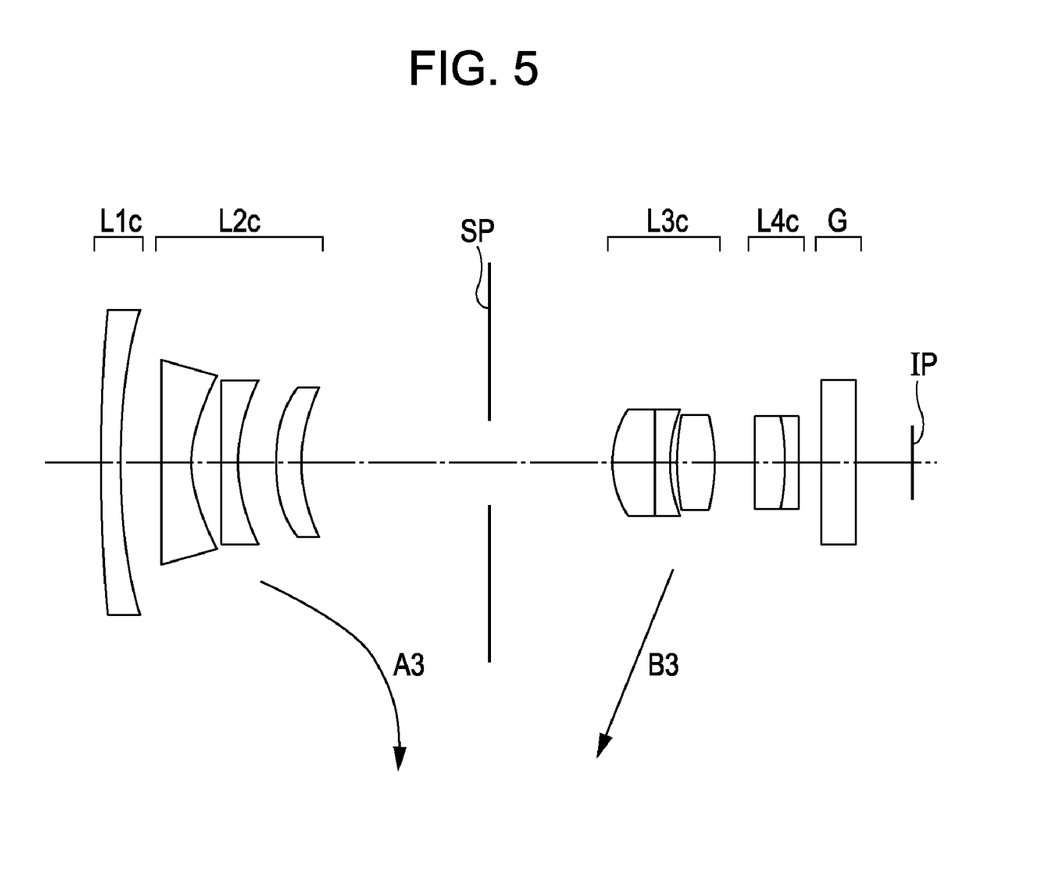
FIG. 5 illustrates a lens sectional view of exemplary embodiment 3.
Figure 6A:
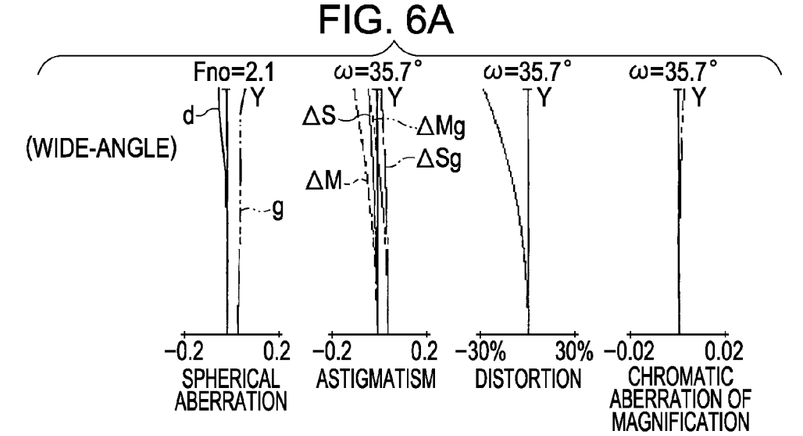
FIGS. 6A, 6B, and 6C illustrate aberrations of exemplary embodiment 3.
Figure 6B:
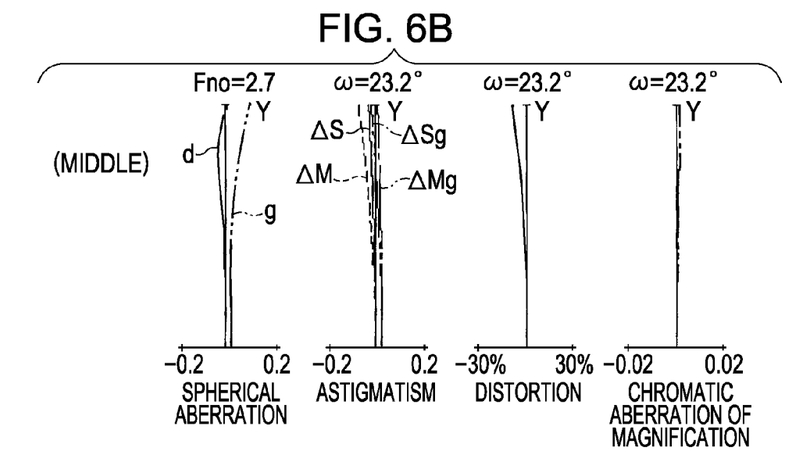
Figure 6C:
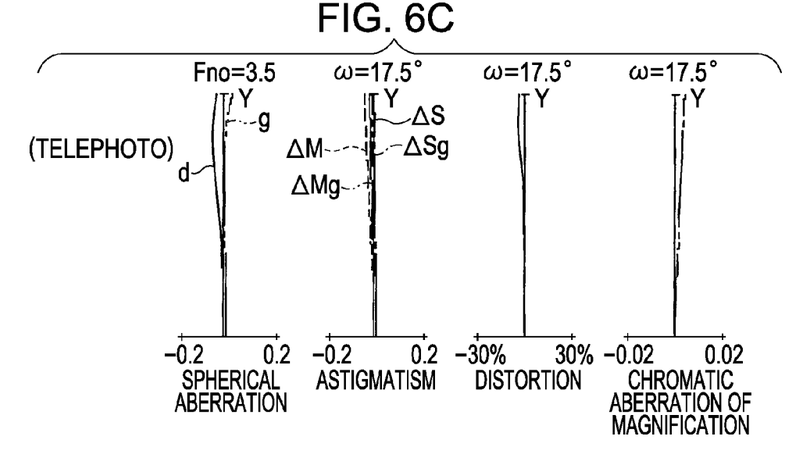

FIG. 5 illustrates a lens sectional view of a zoom lens of exemplary embodiment 3 at the wide-angle end. FIGS. 6A, 6B, and 6C illustrate aberration diagrams of the zoom lens of exemplary embodiment 3 at the wide-angle end, the middle zooming position, and the telephoto end, respectively.

Figure 7:
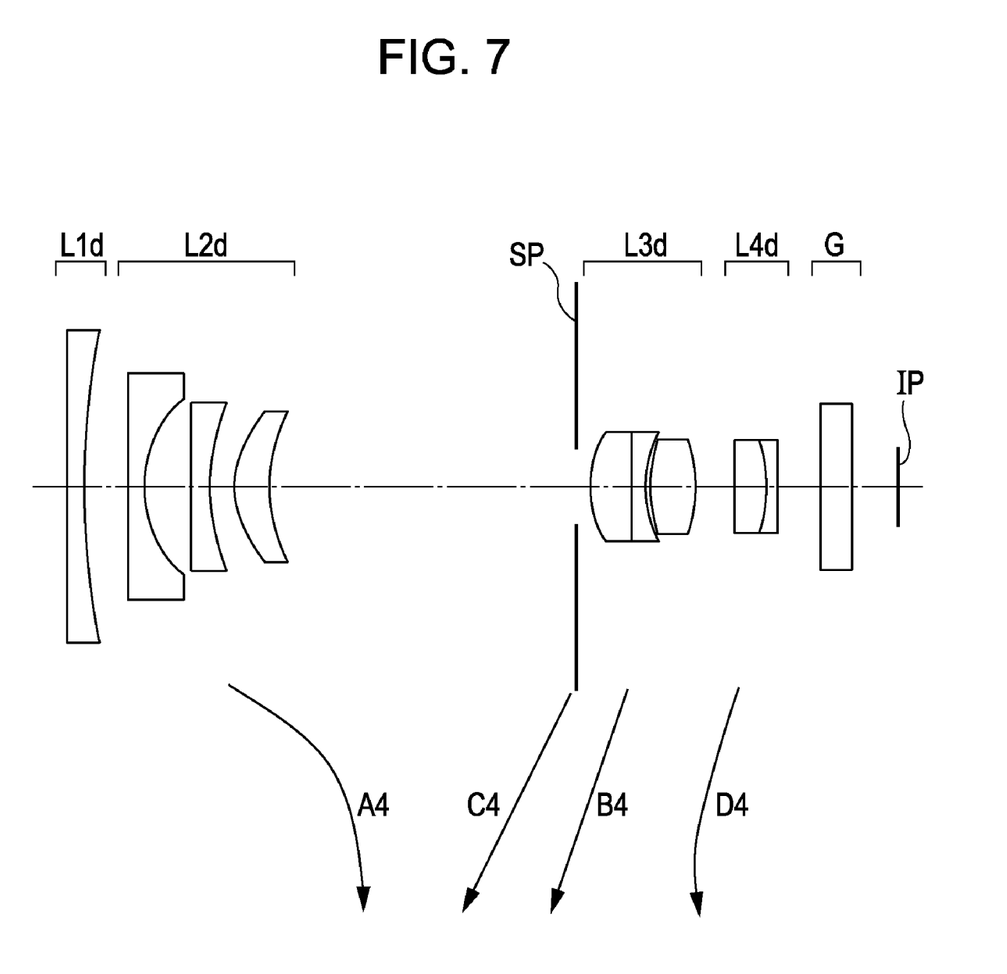
FIG. 7 illustrates a lens sectional view of exemplary embodiment 4.
Figure 8A:
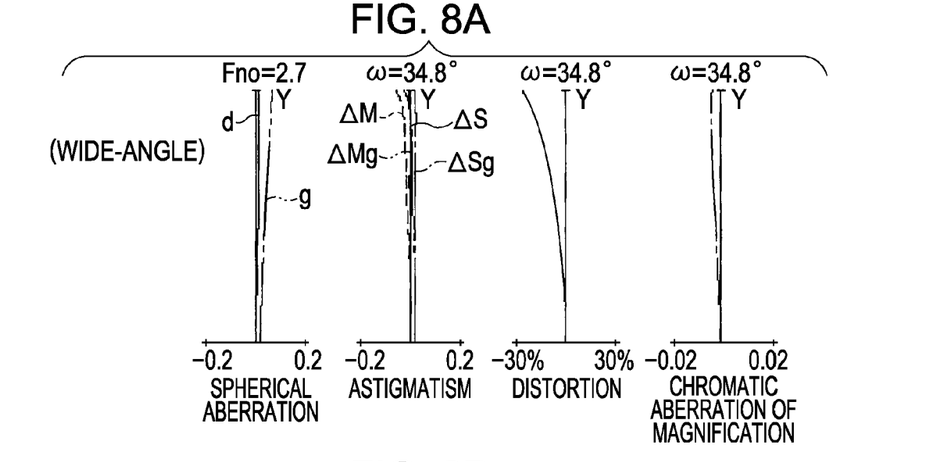
FIGS. 8A, 8B, and 8C illustrate aberrations of exemplary embodiment 4.
Figure 8B:
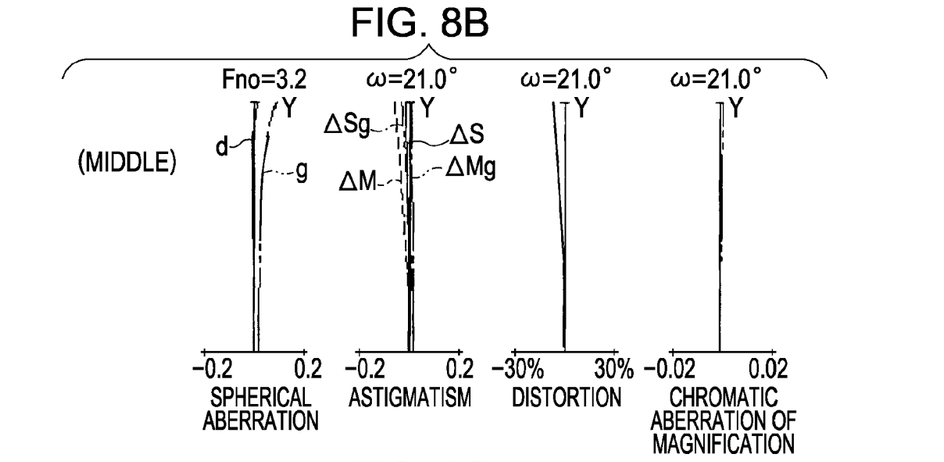
Figure 8C:
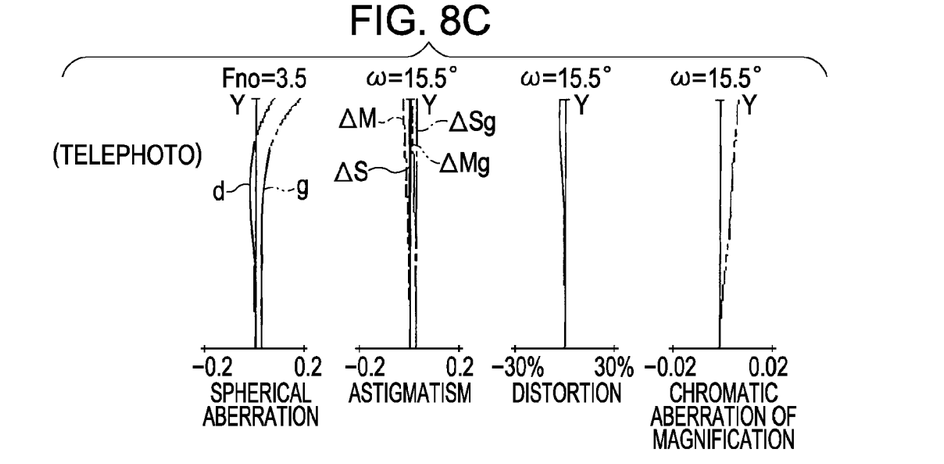

FIG. 7 illustrates a lens sectional view of a zoom lens of exemplary embodiment 4 at the wide-angle end. FIGS. 8A, 8B, and 8C illustrate aberration diagrams of the zoom lens of exemplary embodiment 4 at the wide-angle end, the middle zooming position, and the telephoto end, respectively.

Figure 9:
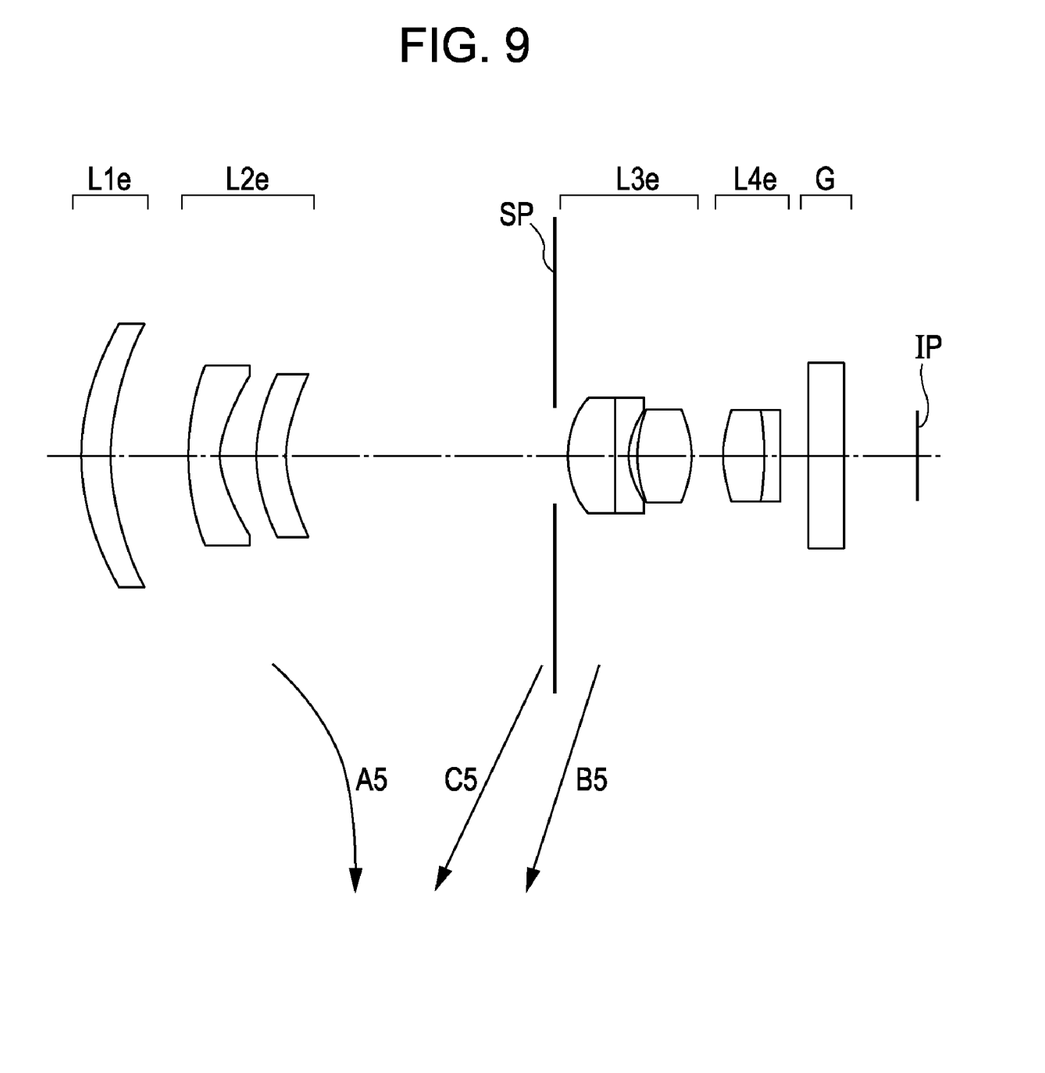
FIG. 9 illustrates a lens sectional view of exemplary embodiment 5.
Figure 10A:
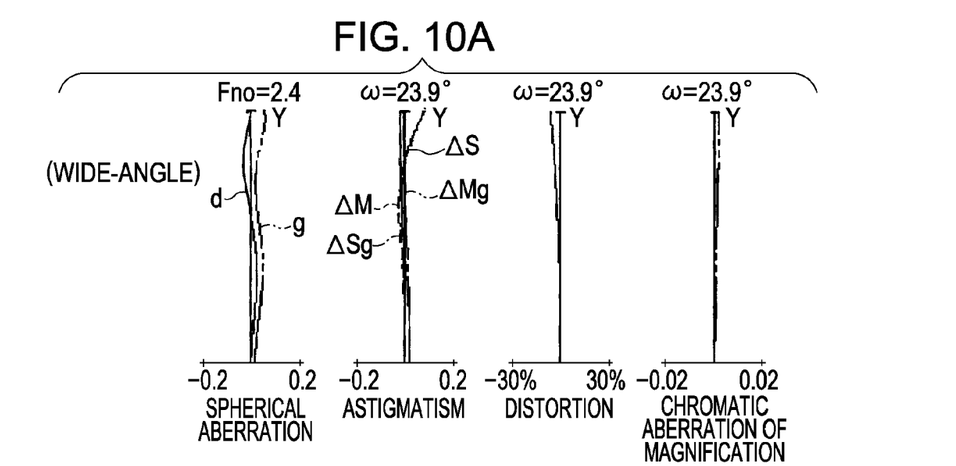
FIGS. 10A, 10B, and 10C illustrate aberrations of exemplary embodiment 5.
Figure 10B:
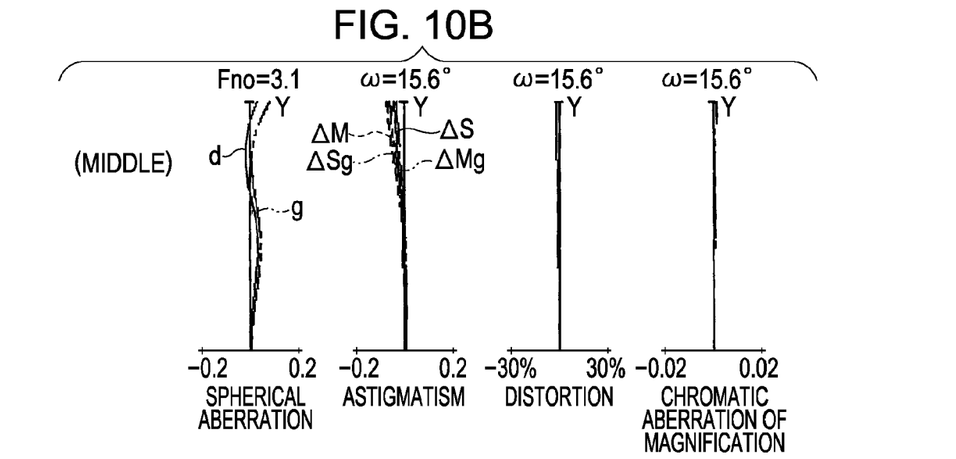
Figure 10C:
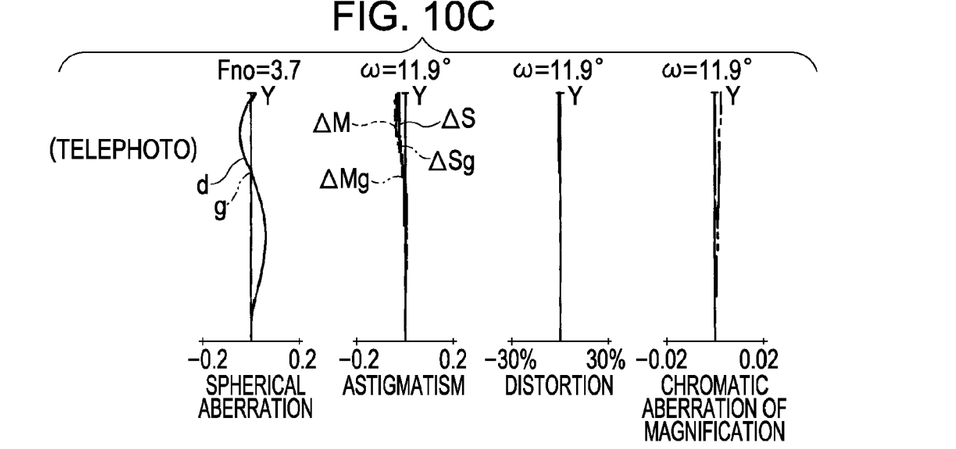

FIG. 9 illustrates a lens sectional view of a zoom lens of exemplary embodiment 5 at the wide-angle end. FIGS. 10A, 10B, and 10C illustrate aberration diagrams of the zoom lens of exemplary embodiment 5 at the wide-angle end, the middle zooming position, and the telephoto end, respectively.

Figure 11:
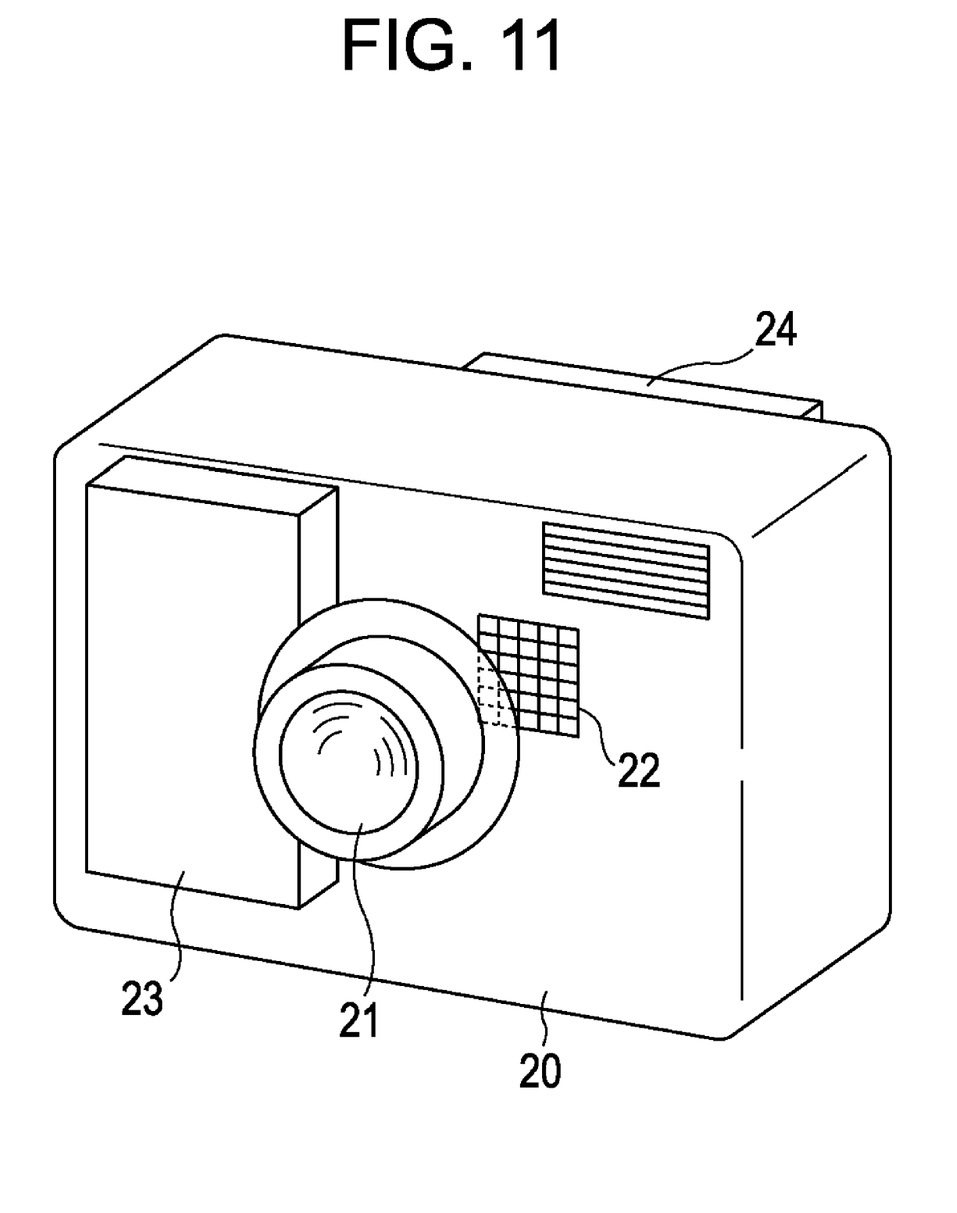
FIG. 11 illustrates a schematic view of an image pickup apparatus of at least one exemplary embodiment of the present invention.

FIG. 11 illustrates a schematic view of an image pickup apparatus of the present invention.

The zoom lens of each exemplary embodiment can be used for image pickup apparatuses (e.g., digital cameras, camcorders, silver-halide film cameras, and monitoring cameras), observing apparatuses (e.g., telescopes, and binoculars), and optical apparatuses (e.g., photocopiers, and projectors).

In the lens sectional views illustrated in FIGS. 1, 3, 5, 7, and 9, the left side is the front side (the object side, the magnification side, or the magnification conjugate side), and the right side is the rear side (the image side, the reduction side, or the reduction conjugate side).

The numerals following reference letter L represent the order from the object side. Reference letter Li denotes the i-th lens unit.

In the lens sectional views, reference letter L1a-e denotes a first lens unit having a negative refractive power (optical power, which is the inverse of the focal length), reference letter L2a-e denotes a second lens unit having a negative refractive power, reference letter L3a-e denotes a third lens unit having a positive refractive power, and reference character L4a-e denotes a fourth lens unit having a positive refractive power.

Reference letter SP denotes an aperture stop, which is disposed on the object side of the third lens unit L3.

Reference letter G denotes an optical block corresponding to an optical filter, a face plate, a quartz low pass filter, an infrared cut-off filter, or the like.

Reference letter IP denotes an image plane where a light-sensitive plane is placed. When the zoom lens is used as a photographing optical system for a camcorder or a digital still camera, the light-sensitive plane can correspond to the imaging plane of a solid-state image pickup device (photoelectric conversion device) such as a CCD sensor or a CMOS sensor. In the case of a silver-halide film camera, the light-sensitive plane can correspond to the film plane.

In the aberration diagrams, reference letters d and g represent the d-line and g-line, respectively. Reference letters $\Delta M$ and $\Delta S$ denote the meridional image plane and the sagittal image plane, respectively, of the d-line. Reference letters $\Delta Mg$ and $\Delta Sg$ denote the meridional image plane and the sagittal image plane, respectively, of the g-line, where the Y-axis in the spherical aberration's graph is entrance pupil radius, the Y-axis in the astigmatism's, distortion's and chromatic aberration of magnification's graphs is image height.

The chromatic aberration of magnification is indicated by the g-line. Reference letter $\omega$ denotes the half field angle. Reference letter Fno denotes the F-number.

In each exemplary embodiment, the wide-angle end and the telephoto end refer to the zooming positions where the zoom lens units are located at either end of their mechanically movable range on the optical axis.

In each exemplary embodiment, during zooming from the wide-angle end to the telephoto end, the lens units move as shown by arrows (e.g., A1-5; B1-5; and D4).

In exemplary embodiments 1 to 3 of FIGS. 1, 3, and 5, during zooming from the wide-angle end to the telephoto end, the third lens unit L3a-c moves in a straight locus toward the object side as shown by an arrow (B1-3).

The second lens unit L2a-c moves (A1-3) in a locus convex toward the image side so as to correct the image plane fluctuation accompanying zooming.

The first and fourth lens units, in exemplary embodiments 1 to 3, L1a-c and L4a-c do not move for zooming.

The aperture stop SP does not move for zooming. When focusing is performed, the second lens unit L2a-c is moved. However, the third lens unit L3a-c and the fourth lens unit L4a-c can also be moved for focusing.

That is to say, the distance between the second lens unit L2a-c and the stop SP and the distance between the stop SP and the third lens unit L3a-c change with zooming. In addition, during zooming, the distance between the first lens unit L1a-c and the second lens unit L2a-c, the distance between the second lens unit L2a-c and the third lens unit L3a-c, and the distance between the third lens unit L3a-c and the fourth lens unit L4a-c change. At the telephoto end, compared to the wide angle end, the distance between the first lens unit L1a-c and the second lens unit L2a-c is larger, the distance between the second lens unit L2a-c and the third lens unit L3a-c is smaller, and the distance between the third lens unit L3a-c and the fourth lens unit L4a-c is larger. Although the second and third lens units L2a-c and L3a-c move in exemplary embodiments 1, 2, and 3, the present invention is not limited to this. By moving at least one of the second, third, and fourth lens units L2a-c, L3a-c, and L4a-c, the distances between the lens units change.

In exemplary embodiment 4 of FIG. 7, during zooming from the wide-angle end to the telephoto end, as shown by an arrow (A4), the second lens unit L2d moves in a locus convex toward the image side. The third lens unit L3d moves (B4) in a straight locus toward the object side. The fourth lens unit L4d moves (D4) in a locus convex toward the object side. The aperture stop SP moves (C4) independently in a straight locus toward the object side. The term "move independently" means to move along a locus different from those of the lens units during zooming. That is to say, during zooming, the stop SP moves along a locus different from those of the lens units, particularly the adjacent second and third lens units L2d and L3d. The first lens unit L1d does not move for zooming.

When focusing is performed, the second lens unit L2d is moved. However, the third lens unit L3d and the fourth lens unit L4d can also be moved for focusing.

In this exemplary embodiment, the distance between the second lens unit L2d and the stop SP and the distance between the stop SP and the third lens unit L3d change with zooming. In addition, during zooming, the distance between the first lens unit L1d and the second lens unit L2d, the distance between the second lens unit L2d and the third lens unit L3d, and the distance between the third lens unit L3d and the fourth lens unit L4d change. At the telephoto end, compared to the wide angle end, the distance between the first lens unit L1d and the second lens unit L2d is larger, the distance between the second lens unit L2d and the third lens unit L3d is smaller, and the distance between the third lens unit L3d and the fourth lens unit L4d is larger. Although the second, third, and fourth lens units L2d, L3d, and L4d move in exemplary embodiment 4, the present invention is not limited to this. By moving at least one of the second, third, and fourth lens units L2d, L3d, and L4d, the distances between the lens units change.

In exemplary embodiment 5 of FIG. 9, during zooming from the wide-angle end to the telephoto end, the second lens unit L2e moves (A5) along part of a locus convex toward the image side.

The third lens unit L3e moves (B5) in a straight locus toward the object side.

The aperture stop SP moves (C5) independently toward the object side. The first and fourth lens units L1e and L4e do not move for zooming.

When focusing is performed, the second lens unit L2e is moved. However, the third lens unit L3e and the fourth lens unit L4e can also be moved for focusing.

In this exemplary embodiment, the distance between the second lens unit L2e and the stop SP and the distance between the stop SP and the third lens unit L3e change with zooming. In addition, during zooming, the distance between the first lens unit L1e and the second lens unit L2e, the distance between the second lens unit L2e and the third lens unit L3e, and the distance between the third lens unit L3e and the fourth lens unit L4e change. At the telephoto end, compared to the wide angle end, the distance between the first lens unit L1e and the second lens unit L2e is larger, the distance between the second lens unit L2e and the third lens unit L3e is smaller, and the distance between the third lens unit L3e and the fourth lens unit L4e is larger. Although the second and third lens units L2e and L3e move in exemplary embodiment 5, the present invention is not limited to this. By moving at least one of the second, third, and fourth lens units L2e, L3e, and L4e, the distances between the lens units change.

In general, a two-unit zoom lens is used as a wide-angle zoom lens for single-lens reflex cameras. A two-unit zoom lens includes a first lens unit having a negative refractive power and a second lens unit having a positive refractive power and performs zooming by changing the relative distance between the lens units.

In this two-unit zoom lens, in order to make the entire lens system compact, to secure a predetermined back focus, and to reduce the entire lens length, the refractive power of each lens unit can be increased.

However, if the refractive power of each lens unit is increased, the aberration related to abaxial rays at a large incident ray height becomes prominent.

For example, in a four-unit negative lead type zoom lens, in order to make the entire lens system small and wide-field-angle, and to achieve excellent optical performance, one can appropriately set the relationship between the stop and each lens unit, and the refractive power arrangement and the lens shape of each lens unit.

Particularly, if the movement of each lens unit during zooming, the lens configuration of each lens unit, and the relationship between the stop and each lens unit are inappropriate, it is difficult to reduce the size of the entire system, and to achieve a wide field angle and high optical performance.

Therefore, the zoom lens of each exemplary embodiment is configured so that the field angle is wide, and so as to be able to well correct aberrations even when the back focus is long.

First, the zoom lens of each exemplary embodiment has, in order from the object side to the image side, first to fourth lens units L1a-e to L4a-e having negative, negative, positive, and positive refractive powers, respectively.

As described above, the first lens unit L1a-e and the second lens unit L2a-e have negative refractive powers, and the third lens unit L3a-e and the fourth lens unit L4a-e on the image side thereof have positive refractive powers, and thereby a retro focus type is easily configured.

In addition, as shown in the hereinafter-described conditional expression (2), by making the negative refractive power of the first lens unit L1a-e stronger than that of the second lens unit L2a-e, the fluctuation in spherical aberration occurring during zooming is reduced.

Making the negative refractive power of the first lens unit L1a-e stronger than that of the second lens unit L2a-e militates against correcting distortion at the wide-angle end. However, the distortion can be sufficiently corrected by an alternate method, for example, an electrical method.

In each exemplary embodiment, during zooming from the wide-angle end to the telephoto end, the third lens unit L3a-e moves in a straight locus from the image side to the object side, and the second lens unit L2a-e moves so as to control the fluctuation in image plane position accompanying zooming. The fourth lens unit L4a-e mainly distances the exit pupil from the image plane so as to bring the entire lens system close to a so-called telecentric system. Bringing the entire lens system close to a telecentric system can efficiently improve the collecting performance of a micro-lens provided in front of the solid-state image pickup device, and prevents the light quantity ratio between the center and periphery of the image from being extremely imbalanced.

In exemplary embodiments 1 to 3 and 5, the fourth lens unit L4a-e does not move relative to the imaging plane (image plane) during zooming so that a zooming drive mechanism can be disposed away from an electronic circuit connected to the solid-state image pickup device. Since the fourth lens unit L4a-e, which is the most image-side lens unit, does not move, dust generated from a drive mechanism for zooming and focusing is prevented from being directly attached to the solid-state image pickup device.

In addition, when the aperture stop SP does not move relative to the imaging plane during zooming as in exemplary embodiments 1 to 3, the need for an actuator moving the aperture stop SP during zooming is eliminated, and the structure is simplified.

In addition, compared to the case where the stop SP is moved together with the third lens unit L3a-e, the third lens unit L3a-e (movable unit) is small.

In each exemplary embodiment, the first lens unit L1a-e does not move relative to the imaging plane during zooming. Each exemplary embodiment thereby can have a cylindrical (lens barrel) structure protecting the second lens unit L2a-e, which requires high positional accuracy, from the outside.

In addition, since the number of movable lens units can be reduced, the mechanism components can be simplified. The simplification of the mechanism components can reduce the generation of dust and achieve a zoom lens having high optical performance.

In each exemplary embodiment, the first lens unit L1a-e is a single negative lens, or a cemented of a positive lens and a negative lens. A single lens refers to a lens that is not cemented and that is apart from the adjacent lenses on the optical axis.

The second lens unit L2a-e includes three lenses: two negative lenses concave toward the image side and a positive lens convex toward the object side in order from the object side to the image side. Alternatively, the second lens unit L2a-e includes two lenses: a negative lens concave toward the image side and a positive lens convex toward the object side in order from the object side to the image side.

The third lens unit L3a-e includes three lenses: a positive lens, a negative lens, and a positive lens in order from the object side to the image side.

The fourth lens unit L4a-e is a cemented lens of a positive lens and a negative lens.

In each exemplary embodiment, at least one of the following conditions is satisfied. A different effect is obtained for each conditional expression.

The numerals following reference letter f represent the order from the object side. Reference letter fi denotes the focal length of the i-th lens unit Li. At least one of the following conditions is satisfied:

$$0.5 < |f2|/f3 < 1.5 \tag{1}$$

$$4 < f1/f2 < 50 \tag{2}$$

$$0.8 < |f1|/f4 < 20 \tag{3}$$

Next, the technical meaning of each conditional expression will be described.

If the |f2|/f3 is less than the lower limit of conditional expression (1), the focal length of the third lens unit L3a-e is long, and the lens system is large. In this case, if the fourth lens unit L4a-e bears the refractive power of the third lens unit L3a-e so as to reduce the size of the entire lens system, a large coma aberration occurs.

If the |f2|/f3 is greater than the upper limit, the focal length of the second lens unit L2a-e is long, the focal length of the third lens unit L3a-e is short, and the fluctuation in image plane position is large during zooming.

Conditional expression (2) is a conditional expression for appropriately distributing refractive power between the first lens unit L1a-e and the second lens unit L2a-e.

If f1/f2 is less than the lower limit of conditional expression (2), the composite negative refractive power of the first lens unit L1a-e and the second lens unit L2a-e is weak, the composite focal length is too long, and therefore the lens size is large.

If f1/f2 is greater than the upper limit of conditional expression (2), it is difficult to balance aberrations.

The refractive power of the first lens unit L1a-e is particularly large, and it is difficult to control the fluctuation in spherical aberration occurring during zooming.

Conditional expression (3) is a conditional expression for appropriately distributing refractive power between the first lens unit L1a-e and the fourth lens unit L4a-e.

If |f1|/f4 is less than the lower limit of conditional expression (3), the focal length of the first lens unit L1a-e is short, and distortion is large at the wide-angle end. Therefore, when the zoom lens is incorporated in a digital camera, a natural image cannot be obtained even by electronic correction. If |f1|/f4 is greater than the lower limit of conditional expression (3), a sufficiently excellent image can be obtained by electronic correction. If |f1|/f4 is greater than the upper limit of conditional expression (3), the focal length of the fourth lens unit L4a-e is short, and the curvature of field increases.

The numerical ranges of conditional expressions (1) to (3) can be set as follows:

$$0.8 < |f2|/f3 < 1.45 \tag{1a}$$

$$4.2 < f1/f2 < 45.0 \tag{2a}$$

$$0.9 < |f1|/f4 < 19.0 \tag{3a}$$

Next, numerical examples of the exemplary embodiments of the present invention 1 to 5 will be shown. In each numerical example of exemplary embodiments (referred to as numerical embodiments), numerals following reference letters R, D, N, and v represent the order from the object side. Reference letter Ri denotes the radius of curvature of the i-th surface in order from the object side. Reference letter Di denotes the i-th lens thickness or air space in order from the object side. Reference letters Ni and vi denote the refractive index and the Abbe number, respectively, for the d line, of the i-th material in order from the object side.

An aspherical shape is expressed by the following conditional expression:

$$X = \frac{\left(\frac{1}{R}\right)H^2}{1+\sqrt{1-(1+k)\left(\frac{H}{R}\right)^2}} + BH^4 + CH^6 + DH^8 + EH^{10} \qquad \text{Expression 1}$$

where X axis is in the direction of the optical axis, H axis is in the direction perpendicular to the optical axis, the traveling direction of light is positive, R is a paraxial radius of curvature, k is an eccentricity, and B, C, D, and E are aspherical coefficients.

In addition, "e-Z" means "$10^{-Z}$." Reference letter f denotes the focal length, reference letter Fno denotes the F-number, and reference letter ω denotes the half field angle.

Table 1 shows the relationship between the above conditional expressions and aberrations in the numerical embodiments.

Numerical Embodiment 1 f = 3.19~5.54~7.12 Fno = 2.2~2.9~3.7 2ω = 70.4°~45.2°~35.1°

| | | | |
|---|---|---|---|
| R 1 = 51.878 | D 1 = 2.00 | N 1 = 1.65844 | v 1 = 50.9 |
| R 2 = ∞ | D 2 = 1.40 | N 2 = 1.48749 | v 2 = 70.2 |
| R 3 = 31.176 | D 3 = Variable | | |
| R 4 = 18.957 | D 4 = 0.90 | N 3 = 1.48749 | v 3 = 70.2 |
| R 5 = 5.381 | D 5 = 2.38 | | |
| R 6 = −107.116 | D 6 = 0.80 | N 4 = 1.69680 | v 4 = 55.5 |
| R 7 = 9.333 | D 7 = 1.41 | | |
| R 8 = 7.695 | D 8 = 1.10 | N 5 = 1.84666 | v 5 = 23.9 |
| R 9 = 11.279 | D 9 = Variable | | |
| R10 = Stop | D10 = Variable | | |
| *R11 = 4.661 | D11 = 2.00 | N 6 = 1.80610 | v 6 = 40.7 |
| R12 = −219.325 | D12 = 0.80 | N 7 = 1.84666 | v 7 = 23.8 |
| R13 = 4.469 | D13 = 0.70 | | |
| R14 = 16.348 | D14 = 1.80 | N 8 = 1.77250 | v 8 = 49.6 |
| R15 = −10.230 | D15 = Variable | | |
| R16 = 16.971 | D16 = 1.80 | N 9 = 1.51633 | v 9 = 64.1 |
| R17 = −12.138 | D17 = 0.80 | N10 = 1.84666 | v 9 = 23.9 |
| R18 = −19.896 | D18 = 1.48 | | |

-continued

| | | | |
|---|---|---|---|
| R19 = ∞ | D19 = 2.00 | N11 = 1.51633 | ν11 = 64.1 |
| R24 = ∞ | | | |

| | Focal length | | |
|---|---|---|---|
| Variable distance | 3.19 | 5.54 | 7.12 |
| D3 | 1.50 | 6.38 | 6.59 |
| D9 | 7.75 | 2.93 | 2.66 |
| D10 | 5.84 | 2.76 | 0.71 |
| D15 | 1.20 | 4.28 | 6.34 |

Aspherical coefficients

R11 k = 2.71709e−01 B = −1.17808e−03 C = −3.38618e−05
D = 1.75326e−07 E = −2.10401e−07

Numerical Embodiment 2 f = 3.09~5.41~7.01 Fno = 2.2~2.9~3.6 2ω = 72.1°~45.2°~35.6°

| | | | |
|---|---|---|---|
| R 1 = ∞ | D 1 = 1.00 | N 1 = 1.51633 | ν 1 = 64.1 |
| R 2 = 103.266 | D 2 = Variable | | |
| R 3 = 44.294 | D 3 = 1.00 | N 2 = 1.48749 | ν 2 = 70.2 |
| R 4 = 7.020 | D 4 = 4.14 | | |
| R 5 = −17.668 | D 5 = 1.00 | N 3 = 1.60311 | ν 3 = 60.6 |
| R 6 = 17.688 | D 6 = 1.50 | N 4 = 1.84666 | ν 4 = 23.9 |
| R 7 = 101.822 | D 7 = Variable | | |
| R 8 = Stop | D 8 = Variable | | |
| *R 9 = 4.981 | D 9 = 2.00 | N 5 = 1.69350 | ν 5 = 53.2 |
| R10 = −389.300 | D10 = 0.80 | N 6 = 1.69895 | ν 6 = 30.1 |
| R11 = 4.641 | D11 = 0.70 | | |
| R12 = 13.524 | D12 = 1.80 | N 7 = 1.77250 | ν 7 = 49.6 |
| R13 = −18.660 | D13 = Variable | | |
| R14 = 13.587 | D14 = 1.80 | N 8 = 1.83481 | ν 8 = 42.7 |
| R15 = −31.076 | D15 = 0.80 | N 9 = 1.84666 | ν 9 = 23.9 |
| R16 = 23.257 | D16 = 1.40 | | |
| R17 = ∞ | D17 = 2.00 | N10 = 1.51633 | ν10 = 64.1 |
| R18 = ∞ | | | |

| | Focal length | | |
|---|---|---|---|
| Variable distance | 3.09 | 5.41 | 7.01 |
| D3 | 3.00 | 10.65 | 11.43 |
| D7 | 14.10 | 6.45 | 5.67 |
| D8 | 7.01 | 3.40 | 0.99 |
| D13 | 1.00 | 4.61 | 7.02 |

Aspherical coefficients

R 9 k = 2.44771e−01 B = −2.49699e−04 C = −2.33244e−07
D = 6.46255e−07 E = −1.04203e−07

Numerical Embodiment 3 f = 3.13~5.26~7.13 Fno = 2.1~2.7~3.5 2ω = 71.4°~46.3°~35.0°

| | | | |
|---|---|---|---|
| R 1 = 125.000 | D 1 = 1.20 | N 1 = 1.48749 | ν 1 = 70.2 |
| R 2 = 32.373 | D 2 = Variable | | |
| R 3 = ∞ | D 3 = 1.00 | N 2 = 1.48749 | ν 2 = 70.2 |
| R 4 = 7.207 | D 4 = 2.74 | | |
| R 5 = −179.539 | D 5 = 1.00 | N 3 = 1.48749 | ν 3 = 70.2 |
| R 6 = 10.494 | D 6 = 2.37 | | |
| R 7 = 9.291 | D 7 = 1.60 | N 4 = 1.76182 | ν 4 = 26.5 |
| R 8 = 12.367 | D 8 = Variable | | |
| R 9 = Stop | D 9 = Variable | | |
| *R10 = 6.237 | D10 = 2.50 | N 5 = 1.69350 | ν 5 = 53.2 |
| R11 = ∞ | D11 = 0.80 | N 6 = 1.69895 | ν 6 = 30.1 |
| R12 = 6.168 | D12 = 0.47 | | |
| R13 = 14.844 | D13 = 2.40 | N 7 = 1.60311 | ν 7 = 60.6 |
| R14 = −10.241 | D14 = Variable | | |
| R15 = 52.400 | D15 = 2.00 | N 8 = 1.69680 | ν 8 = 55.5 |
| R16 = −8.600 | D16 = 0.80 | N 9 = 1.80518 | ν 9 = 25.4 |
| R17 = −32.900 | D17 = 1.40 | | |
| R18 = ∞ | D18 = 2.00 | N10 = 1.51633 | ν10 = 64.1 |
| R19 = ∞ | | | |

| | Focal length | | |
|---|---|---|---|
| Variable distance | 3.13 | 5.26 | 7.13 |
| D2 | 2.60 | 10.15 | 10.89 |
| D8 | 11.50 | 3.95 | 3.21 |
| D9 | 7.75 | 4.15 | 1.20 |
| D14 | 2.40 | 6.00 | 8.9 |

Aspherical coefficients

R10 k = −6.27256e−01 B = −1.46455e−04
C = −3.29397e−06 D = −6.85706e−08

Numerical Embodiment 4 f = 3.24~5.87~8.11 Fno = 2.7~3.2~3.5 2ω = 69.6°~41.9°~31.0°

| | | | |
|---|---|---|---|
| R 1 = 364.288 | D 1 = 1.20 | N 1 = 1.48749 | ν 1 = 70.2 |
| R 2 = 52.602 | D 2 = Variable | | |
| R 3 = −309.030 | D 3 = 1.00 | N 2 = 1.48749 | ν 2 = 70.2 |
| R 4 = 7.225 | D 4 = 2.74 | | |
| R 5 = −184.566 | D 5 = 1.00 | N 3 = 1.51633 | ν 3 = 64.1 |
| R 6 = 10.454 | D 6 = 2.37 | | |
| R 7 = 9.512 | D 7 = 1.60 | N 4 = 1.76182 | ν 4 = 26.5 |
| R 8 = 12.067 | D 8 = Variable | | |
| R 9 = Stop | D 9 = Variable | | |
| *R10 = 6.223 | D10 = 2.50 | N 5 = 1.69350 | ν 5 = 53.2 |
| R11 = 104.911 | D11 = 0.80 | N 6 = 1.69895 | ν 6 = 30.1 |
| R12 = 6.201 | D12 = 0.47 | | |
| R13 = 14.752 | D13 = 2.40 | N 7 = 1.63854 | ν 7 = 55.4 |
| R14 = −10.285 | D14 = Variable | | |
| R15 = 55.575 | D15 = 2.00 | N 8 = 1.57060 | ν 8 = 61.5 |
| R16 = −8.615 | D16 = 0.80 | N 9 = 1.80518 | ν 9 = 25.4 |
| R17 = −33.029 | D17 = Variable | | |
| R18 = ∞ | D18 = 2.00 | N10 = 1.51633 | ν10 = 64.1 |
| R19 = ∞ | | | |

| | Focal length | | |
|---|---|---|---|
| Variable distance | 3.24 | 5.87 | 8.11 |
| D2 | 2.60 | 10.84 | 11.44 |
| D8 | 18.50 | 6.05 | 2.01 |
| D9 | 0.75 | 1.27 | 1.70 |
| D14 | 2.40 | 4.74 | 6.66 |
| D17 | 2.40 | 3.75 | 4.84 |

Aspherical coefficient

R10 k = −6.70474e−01 B = −1.36328e−04
C = −3.29396e−06 D = −6.85706e−08

Numerical Embodiment 5

| f = 5.08~8.07~10.73 Fno = 2.4~3.1~3.7 2ω = 47.8°~31.2°~23.7° | | | |
|---|---|---|---|
| R 1 = 20.000 | D 1 = 1.20 | N 1 = 1.48749 | ν 1 = 70.2 |
| R 2 = 12.020 | D 2 = Variable | | |
| R 3 = 24.047 | D 3 = 1.00 | N 2 = 1.69350 | ν 2 = 53.2 |
| *R 4 = 5.215 | D 4 = 2.37 | | |
| R 5 = 6.834 | D 5 = 1.60 | N 3 = 1.84666 | ν 3 = 23.8 |
| R 6 = 8.551 | D 6 = Variable | | |
| R 7 = Stop | D 7 = Variable | | |
| *R 8 = 5.473 | D 8 = 2.50 | N 4 = 1.69350 | ν 4 = 53.2 |
| R 9 = 162.507 | D 9 = 0.80 | N 5 = 1.69895 | ν 5 = 30.1 |
| R10 = 4.632 | D10 = 0.53 | | |
| R11 = 8.174 | D11 = 2.40 | N6 = 1.69680 | ν6 = 55.5 |
| R12 = −23.431 | D12 = Variable | | |
| R13 = 23.684 | D13 = 2.00 | N7 = 1.48749 | ν7 = 70.2 |
| R14 = −21.027 | D14 = 0.80 | N8 = 1.80518 | ν8 = 25.4 |
| R15 = −55.615 | D15 = 1.40 | | |
| R16 = ∞ | D16 = 2.00 | N10 = 1.51633 | ν10 = 64.1 |
| R17 = ∞ | | | |

| Variable | Focal length | | |
|---|---|---|---|
| distance | 5.08 | 8.07 | 10.73 |
| D2 | 4.65 | 9.09 | 9.02 |
| D6 | 14.08 | 5.68 | 2.51 |
| D7 | 0.75 | 1.02 | 1.25 |
| D12 | 2.4 | 6.09 | 9.1 |

| Aspherical coefficients | | | |
|---|---|---|---|
| R 4 k = −4.314704e−01 | B = −1.54363e−04 | C = −2.95368e−07 | D = −6.05464e−07 |
| R 8 k = 8.15864e−01 | B = −1.04246e−03 | C = −3.91678e−06 | D = −4.82940e−06 |

TABLE 1

| | Embodiment 1 | Embodiment 2 | Embodiment 3 | Embodiment 4 | Embodiment 5 |
|---|---|---|---|---|---|
| f1 | −397.055 | −200.000 | −90.000 | −126.274 | −65.000 |
| f2 | −9.119 | −10.700 | −10.317 | −9.279 | −14.896 |
| f3 | 8.635 | 10.557 | 10.573 | 10.057 | 10.453 |
| f4 | 22.156 | 35.924 | 40.044 | 131.032 | 50.170 |
| (1) | 1.056 | 1.013 | 0.976 | 0.923 | 1.425 |
| (2) | 43.543 | 18.692 | 8.723 | 13.608 | 4.363 |
| (3) | 17.921 | 5.567 | 2.248 | 0.964 | 1.296 |

Next, an exemplary embodiment of a digital still camera (image pickup apparatus) using a zoom lens according to the present invention as a photographing optical system will be described with reference to FIG. 11.

In FIG. 11, reference numeral 20 denotes a camera body, and reference numeral 21 denotes a photographing optical system that is a zoom lens according to at least one exemplary embodiment of the present invention. Reference numeral 22 denotes a solid-state image pickup device (photoelectric conversion device), such as a CCD sensor or a CMOS sensor, receiving an object image formed by the photographing optical system 21. Reference numeral 23 denotes a memory recording information corresponding to the object image photoelectric-converted by the image pickup device 22. Reference numeral 24 denotes a finder for observing the object image formed on the solid-state image pickup device 22. The finder 24 is, for example, a liquid crystal display panel.

As described above, applying a zoom lens according to at least one exemplary embodiment of the present invention to an image pickup apparatus, such as a digital still camera, achieves an image pickup apparatus that is compact and has high optical performance.

The above exemplary embodiments provide a zoom lens in which aberrations are well corrected and that has a wide field angle and high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-111902 filed Apr. 14, 2006, which is hereby incorporated by reference herein in its entirety.

What is claimed is:

1. A zoom lens comprising in order from an object side to an image side:

a first lens unit having a negative refractive power, the first lens unit being disposed closest to the object side;

a second lens unit having a negative refractive power, the second lens unit being disposed adjacent to the first lens unit;

a stop, the stop being disposed adjacent to the second lens unit;

a third lens unit having a positive refractive power, the third lens unit being disposed adjacent to the stop; and a fourth lens unit having a positive refractive power, the fourth lens unit being disposed adjacent to the third lens unit, wherein the distance between the first lens unit and the second lens unit changes during zooming, at least one of the second, third, and fourth lens units moves so that the distance between the second lens unit and the third lens unit at the telephoto end is smaller than that at the wide-angle end and so that the distance between the third lens unit and the fourth lens unit at the telephoto end is larger than that at the wide-angle end, and the distance between the stop and the third lens unit changes during zooming.

2. The zoom lens according to claim 1, wherein the first lens unit does not move for zooming.

3. The zoom lens according to claim 1, wherein the fourth lens unit does not move for zooming.

4. The zoom lens according to claim 1, wherein the stop moves independently of any of the lens units during zooming.

5. The zoom lens according to claim 1, wherein the stop does not move during zooming.

6. The zoom lens according to claim 1, wherein a focal length of the second lens unit (f2) and a focal length of the third lens unit (f3) satisfy the following condition:

$$0.5<|f2|/f3<1.5.$$

7. The zoom lens according to claim 1, wherein a focal length of the first lens unit (f1) and a focal length of the second lens unit (f2) satisfy the following condition:

$$4<f1/f2<50.$$

8. The zoom lens according to claim 1, wherein a focal length of the first lens unit (f1) and a focal length of the fourth lens unit (f4) satisfy the following condition:

$$0.8<|f1|/f4<20.$$

9. The zoom lens according to claim 1, wherein the first lens unit is a single negative lens, the second lens unit consists of, in order from the object side to the image side, two negative lenses concave toward the image side and a positive lens convex toward the object side, the third lens unit consists of, in order from the object side to the image side, a positive lens, a negative lens, and a positive lens, and the fourth lens unit is a cemented lens of a positive lens and a negative lens.

10. The zoom lens according to claim 1, wherein the zoom lens forms an object image on an image pickup device.

11. The zoom lens according to claim 1, wherein the first lens unit is a single negative lens, the second lens unit consists of, in order from the object side to the image side, a negative lens concave toward the image side and a positive lens convex toward the object side, the third lens unit consists of, in order from the object side to the image side, a positive lens, a negative lens, and a positive lens, and the fourth lens unit is a cemented lens of a positive lens and a negative lens.

12. The zoom lens according to claim 1, wherein the first lens unit is a cemented lens of a positive lens and a negative lens, the second lens unit consists of, in order from the object side to the image side, two negative lenses concave toward the image side and a positive lens convex toward the object side, the third lens unit consists of, in order from the object side to the image side, a positive lens, a negative lens, and a positive lens, and the fourth lens unit is a cemented lens of a positive lens and a negative lens.

13. The zoom lens according to claim 1, wherein the first lens unit is a cemented lens of a positive lens and a negative lens, the second lens unit consists of, in order from the object side to the image side, a negative lens concave toward the image side and a positive lens convex toward the object side, the third lens unit consists of, in order from the object side to the image side, a positive lens, a negative lens, and a positive lens, and the fourth lens unit is a cemented lens of a positive lens and a negative lens.

14. An image pickup apparatus comprising:

a zoom lens; and an image pickup device receiving an image formed by the zoom lens, wherein the zoom lens includes, in order from the object side to the image side, a first lens unit having a negative refractive power, a second lens unit having a negative refractive power, a stop, a third lens unit having a positive refractive power, and a fourth lens unit having a positive refractive power, the distance between the first lens unit and the second lens unit changes during zooming, at least one of the second, third, and fourth lens units moves so that the distance between the second lens unit and the third lens unit at the telephoto end is smaller than that at the wide-angle end and so that the distance between the third lens unit and the fourth lens unit at the telephoto end is larger than that at the wide-angle end, and the distance between the stop and the third lens unit changes during zooming.

* * * * *